(12) United States Patent
Vidhun et al.

(10) Patent No.: US 9,813,426 B2
(45) Date of Patent: Nov. 7, 2017

(54) MANAGING TEMPORAL ASPECTS OF ACCOUNTS AND ENTITLEMENTS

(71) Applicant: Oracle International Corporation, Redwood Shores, CA (US)

(72) Inventors: Saheli Dey Vidhun, Yorba Linda, CA (US); Amol Dharmadhikari, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/593,808

(22) Filed: Jan. 9, 2015

(65) Prior Publication Data
US 2015/0200953 A1    Jul. 16, 2015

Related U.S. Application Data

(60) Provisional application No. 61/926,893, filed on Jan. 13, 2014.

(51) Int. Cl.
*H04L 29/06* (2006.01)

(52) U.S. Cl.
CPC ................... *H04L 63/108* (2013.01)

(58) Field of Classification Search
CPC ..................................... H04L 63/108
USPC ......................................... 726/1, 6
See application file for complete search history.

(56) References Cited

U.S. PATENT DOCUMENTS

| | | |
|---|---|---|
| 7,428,750 B1 | 9/2008 | Dunn et al. |
| 8,225,383 B1 | 7/2012 | Channakeshava et al. |
| 8,489,483 B1 | 7/2013 | Gillin et al. |
| 8,532,343 B1 * | 9/2013 | Freedman ........... G06K 9/00335 382/115 |
| 2002/0120860 A1 * | 8/2002 | Ferguson ................ H04W 8/18 726/5 |
| 2003/0040997 A1 | 2/2003 | Rousseau et al. |
| 2008/0288339 A1 * | 11/2008 | Streeter .................. G06Q 30/02 705/14.13 |
| 2011/0196795 A1 | 8/2011 | Pointer |
| 2013/0068366 A1 | 3/2013 | Eng |

(Continued)

OTHER PUBLICATIONS

*Cisco Wireless Control System Configuration Guide*, Release 6.0 chapter 7 "Managing WCS User Accounts," Cisco Systems, Inc. (no date) 20 pages.

(Continued)

*Primary Examiner* — Aubrey Wyszynski
(74) *Attorney, Agent, or Firm* — Kilpatrick Townsend & Stockton LLP

(57) ABSTRACT

A method and system for managing temporal aspects of accounts and entitlements in target systems in an organization is provided. In an embodiment, an identity management system may receive request to create an account on a target system of the organization. In some embodiments, the identity management system may cause, in co-operation with the target system, the account to be created in the target system, at a first time. In some aspects, the identity management system may associate a second time with the account. In some examples, the second time may correspond to an activation time of the account. In some embodiments, the identity management system may cause in co-operation with the target system, the account to be activated on the target system, at the second time.

21 Claims, 9 Drawing Sheets

(56) References Cited

U.S. PATENT DOCUMENTS

2013/0298242 A1* 11/2013 Kumar ............... G06F 21/52
                                                    726/25
2013/0304808 A1  11/2013 Ganz
2014/0058863 A1*  2/2014 Biswas ............. G06Q 20/354
                                                    705/21
2015/0066572 A1   3/2015 Mclaren et al.
2015/0200966 A1   7/2015 Kasturirangan et al.

OTHER PUBLICATIONS

*SAP Customer Relationship Management 7.0* "Territory" SAP SE (copyright 2014) 5 pages.
*SAP Customer Relationship Management 7.0* "Specifying Validity Periods" SAP SE (copyright 2014) 7 pages.
"New User Account Activation Date," forum question https://success.salesforce.com/ (no date).
"Manage Guest Access Application," Purdue University (Jul. 2007) 15 pages.
"Entitlement" *SAP Customer Relationship Management 7.0* "Territory" SAP SE (copyright 2014) 6 pages.
*Windows 2000 Server* Capter 3 "User Accounts," Microsoft Corporation (no date) 7 pages.
U.S. Appl. No. 14/593,823 , "Final Office Action", Sep. 8, 2016, 12 pages.
U.S. Appl. No. 14/593,823 , "Non-Final Office Action", Mar. 2, 2016, 11 pages.

* cited by examiner

MANAGING TEMPORAL ASPECTS OF ACCOUNTS AND ENTITLEMENTS

CROSS-REFERENCES TO RELATED APPLICATIONS

The present application is a non-provisional application of and claims the benefit and priority under 35 U.S.C. 119(e) of U.S. Provisional Application No. 61/926,893, filed Jan. 13, 2014 entitled "TEMPORAL GRANTS OF PROVISIONABLE ENTITIES," the entire contents of which are incorporated herein by reference for all purposes

BACKGROUND OF THE INVENTION

The present disclosure relates generally to computer systems and software, and more particularly to techniques for managing accounts and entitlements in an enterprise environment.

In the context of enterprise systems, a user identity generally refers to information that uniquely identifies a user. By providing some of such information, a user may be permitted to access various resources available within the enterprise. These resources can include, for example, software products, applications (e.g., cloud-based applications, enterprise applications, or any other applications), cloud services, various types of data (e.g., networked files, directory information, databases, or the like) and other resources. In order to effectively manage user access to resources within an enterprise, the enterprise often has to keep track of identity information stored in multiple target systems of the enterprise. As such, finding improved ways to manage user identities and access to available resources within an enterprise continues to be a priority.

BRIEF SUMMARY OF THE INVENTION

In certain embodiments, techniques are provided (e.g., a method, a system, non-transitory computer-readable medium storing code or instructions executable by one or more processors) for managing accounts and entitlements in one or more target systems of an organization. In some embodiments, a target system in an organization can have a set of entitlements defined and ready for assignment to accounts on the target system. One or more of the entitlements for a target system may be granted to an account on the target system for a user. An entitlement granted to an account on a target system enables the account owner (user) to perform a specific task(s) or function(s). An entitlement is thus a privilege or a set of privileges that can be granted to an account associated with a user that governs the user's access to resources within a target system. An entitlement can be of various types including without limitation a role, a responsibility, a group membership, and the like.

In some embodiments, an Identity Management (IDM) system is disclosed that controls the management of accounts and entitlements for users or a group of users, in one or more target systems of the organization. In some embodiments, the management of accounts and entitlements may include, without limitation, creating, provisioning, updating, deleting and activating and deactivating accounts and entitlements.

In accordance with at least some embodiments, a first system is disclosed. In some examples, the first system may correspond to the IDM system. In an embodiment, the first system may be configured to receive a request to create an account for a user on a target system of the organization. In some embodiments, the first system may in co-operation with the target system, cause the account to be created in the target system, at a first time. In some embodiments, the first system may then associate a second time with the account. In an example, the second time may correspond to an activation time of the account. In some embodiments, the first system may in co-operation with the target system cause the account to be activated on the target system at the second time.

In some examples, the first system may determine the second time based on user information specified in the request. In other examples, the first system may determine the second time based on access policies associated with the account. In some examples, the second time may correspond to the start date (i.e., the activation time) of the account.

In some examples, the first system may associate a de-activation time with the account. In some embodiments, the first system may in co-operation with the target system cause the account to be de-activated on the target system at the de-activation time. In some examples, the first system may determine the de-activation time based on user information specified in the request. In other examples, the first system may determine the de-activation time based on access policies associated with the account. In some examples, the de-activation time may correspond to the end date of the account.

In accordance with at least some embodiments, the first system may determine a third time when an entitlement as to be associated with the account. The first system may then associate the entitlement with the account. In some embodiments, the first system may in co-operation with the target system cause the entitlement to be granted at the third time. In some examples, the third time may occur after the second time. In some examples, the third time may correspond to the start date of the entitlement. In some examples, the first system may determine the third time based on user information specified in the request. In other examples, the first system may determine the third time based on access policies associated with the entitlement.

In some examples, the first system may associate a de-activation time with the entitlement. In some embodiments, the first system may in co-operation with the target system cause the entitlement to be revoked on the target system at the de-activation time. In some examples, the first system may determine the de-activation time based on user information specified in the request. In other examples, the first system may determine the de-activation time based on access policies associated with the account. In some examples, the de-activation time may correspond to the end date of the entitlement.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

Figure 1:
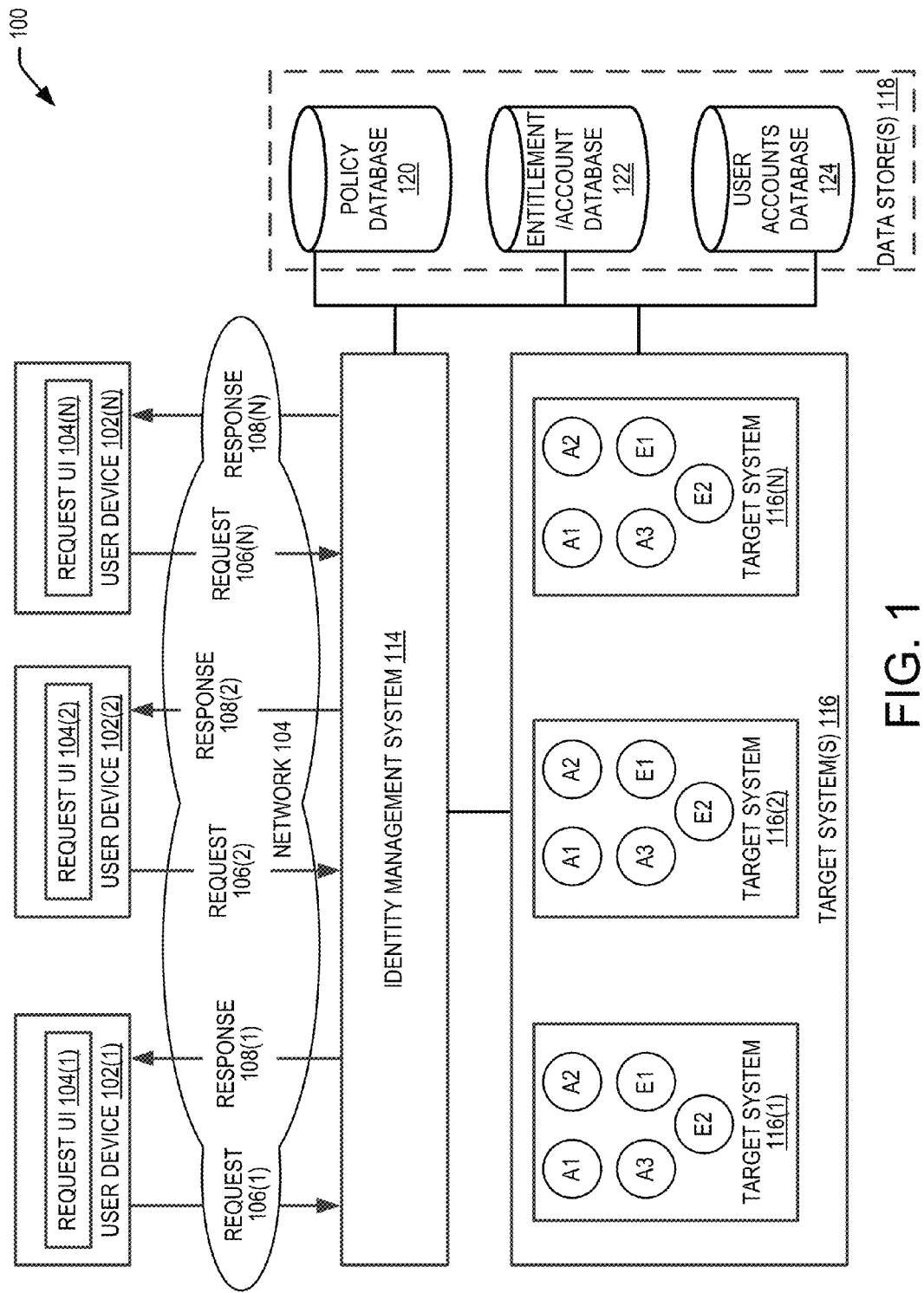
FIG. 1 depicts aspects of an example system architecture 100 for managing accounts and entitlements in one or more target systems of an organization in accordance with at least one embodiment of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

In some embodiments, a 'target system' may refer to any system that provides or comprises one or more resources. The resources to which access is provided, either locally or remotely, by a target system may be of various types including software products, applications (e.g., cloud-based applications, enterprise applications, or any other applications), cloud services, various types of data (e.g., networked files, directory information, databases, or the like), and other resources. A target system may include one or more databases, lightweight directory access protocol (LDAP) servers, Active Directory (AD) systems, Email Systems, UNIX systems and the like. For example, a target system may be an Active Directory (AD) system that provides access to active directory services to access an Active Directory server. In some examples, a target system may be a computing system that provides access to a meeting room, such as access to the meeting room using a badge. In some embodiments, a target system may also be referred to as an application instance.

In some embodiments, a resource provided by a target system may be one of various resource types, including, but not limited to, a software resource, a hardware resource, a data resource, a service, an application, a physical object, a place, a computing resource, and the like. In some embodiments, a hardware resource may include, without limitation, servers, data storage devices, servers, printers, or the like. In some embodiments, a software resource may include, without limitation, a computing program, an application (e.g., cloud-based applications, enterprise applications, or any other applications), a computer-program product (e.g., software), a service (e.g., cloud-based services), or the like. In some embodiments, a data resource may include, without limitation, any accessible data objects such as a file (e.g., a networked file or directory information), a database, and the like.

In certain embodiments, access to resources provided by a target system may be controlled using various types of accounts in the target system. An account may be provisioned in a target system based upon the resources provided by the target system. An account may be of various types such as user accounts, administrative accounts, application accounts, and the like, with each account type providing a particular level of access to one or more resources provided by the target system. Separate accounts (e.g., user accounts, administrative accounts, and/or application accounts) may be provided in a target system to enable a user to access or otherwise log into the target system. An account may be created, or provisioned, to a user or a group of users (e.g., an organization) based on the identity of the user or the group of users. A user or a group of users may be provided with a particular account type to access a particular resource type. For instance, an e-mail account on an Exchange server provided to a user may be an account of a resource type Exchange. A user may be given multiple accounts, each corresponding to an account type for a resource type. For example, a user may have two different accounts for logging into a target system to perform different types of operations. For example, a target system may host an Email exchange server and provide an email account type. The same target system may also host an HR system and provide an HR administrator account type for performing administrative functions related to the HR system. A particular user may have an email account on the target system and also have an HR administrative account on the target system. When logged in using the email account, the user may access emails. When logged in using the HR administrative account, the user can perform administrative tasks related to managing resources in an organization.

In certain embodiments, an account may be associated with an entitlement (e.g., an access privilege or a usage right) to a resource provided by a target system. As such, an account may control access to a resource based on the entitlement granted to the resource by the account. An entitlement associated with an account may provide a user associated with the account a right (e.g., a privilege or a usage right) to perform an operation with respect to a resource provided by the target system. An operation with respect to a resource may correspond to a functionality or a capability related to use of the resource. In some embodiments, an account may be assigned multiple entitlements.

In some embodiments, an entitlement may be granted to an account based on a role or responsibility of the user associated with the account. The role or responsibility of a user may be one which is defined by an organization. In some embodiments, an entitlement may be granted to multiple users. The users may belong to a group within an organization. The group may correspond to a role or responsibility within that organization. An entitlement may be associated with multiple accounts, where each account corresponds to a user identity of a different user.

In some embodiments, an entitlement to a resource may be managed by one or more access policies. An access policy may be associated with one or more account types. An access policy may control access to and use of a resource corresponding to an account type. Since an access policy controls the access to and use of a resource, the access policies associated with an account type control the access rights that a user, having an account of that type, has with respect to the resource. In some embodiments, an access policy may control access to and use of a resource by users in an organization according to one or more roles defined by the organization.

In certain embodiments, 'provisioning' may be used to refer to the allocation of resources to users in conformance with access or provisioning policies. This may involve creating, modifying, or deleting provisionable entities (e.g., account as and/or entitlements) in a target system. A particular resource is said to be provisioned for (or to) a user if the user has been granted access to use the particular resource. An access policy is one of several factors that determine whether a resource can be provisioned to a user. For example, an access policy may, among other things, specify one or more resources and user or groups to which provisioning of the resources is allowed or disallowed. Access policies may be set by a system administrator.

In certain embodiments, users are identified in the IDM system via user identities. Users may include administrators or end-users of the organization. A user may have one or more user identities. A user identity may have one or more associated attributes such as a first name, a last name, a user login, and the like. A user identity may have one or more accounts in a target system with associated entitlements. A user identity may be an enterprise wide identity associated with the user, an identity specific to a target system, an identity specific to an application, and the like.

In accordance with at least some embodiments, the IDM system may be configured to receive a request to create one or more accounts for a user in one or more target systems of the organization. In some embodiments, the IDM system may in co-operation with the one or more target systems, cause the accounts to be created in the one or more target systems, at a first time. The IDM system may then be configured to associate a second time with the accounts. In an example, the second time may correspond to an activation time of the accounts. In certain embodiments, the IDM system may in co-operation with the one or more target systems, cause the accounts to be activated on the one or more target systems, at the second time.

In accordance with at least one non-limiting example, the IDM system may receive a request from an administrator of the organization to create an account for a user (e.g., a future employee) who is expected to join the organization on a specified start date in the future. In an embodiment, the request may specify and/or identify the account and/or accounts to be created for the user and a duration during which the identified accounts should be made available to the user. In some examples, the duration may specify a start date and an end date for the identified accounts. In certain embodiments, the request may also include user-specific information such as the type of user (e.g., employee, contractor, administrator, summer intern and the like) for whom the accounts are to be created.

In some embodiments, the IDM system, may, in co-operation with the target system, cause the identified account to be created or provisioned for the user in the target system, at a first time. In some embodiments, the IDM system may then be configured to associate a second time with the account. As noted above, in some examples, the second time may correspond to the activation time of the account. In some examples, the second time may correspond to the start date of the identified account, specified in the request. In some examples, the start date of the identified account may correspond to the user's start date in the organization. In some embodiments, the IDM system may then in co-operation with the target system, cause the account to be activated on the target system, at the second time.

For example, the IDM system may receive a request to create a 'user account' for a user in an Active Directory system of the organization. The IDM system may then in co-operation with the Active Directory system cause the account to be created at a first time, say Jan. 1, 2014. The IDM system may then associate a second time with the account. The second time may correspond to an activation time of the account. For example, the IDM system may determine the second time based on information (e.g., the start date of the account) specified in the request. For example, the IDM system may determine that the start date of the account is Jan. 15, 2014. In some examples, the IDM system may in co-operation with the Active Directory system, cause the account to be activated on the Active Directory system on Jan. 15, 2014.

In accordance with at least some examples, the request itself may not specify and/or identify the accounts to be created for the user. In such a situation, the IDM system may be configured to identify the accounts to be created for the user based on policy information. In some examples, policy information may include access policies and/or rules that specify whether or not an account can be created or provisioned for a particular user and/or a particular type of user, the number and type of accounts that can be provisioned for the user, and the like. For instance, policy information may store rules that indicate that a user who is identified to be a future 'system administrator' of the organization may be provided access to one set of accounts (user account, root account, administrative account) in one or more target systems of the organization, whereas a user who is identified to be a future 'employee' of the organization may be provided access only to a subset of these accounts. In another instance, policy information may store rules that indicate that a user who is identified to be a future 'employee' of the organization may be provided access to various types of accounts such as a 'CRM account,' a 'sales account,' and an 'inventory account,' in one or more target systems of the organization while a user who is identified to be a future 'contractor' of the organization may be provided access to a subset of these accounts.

Upon identifying the accounts to be created for the user as discussed above, in some instances, the IDM system may also be configured to determine the start dates and end dates for each of the identified accounts. In some examples, the IDM system may be configured to determine the start dates and end dates for each of the identified accounts based on the type of user for whom the account is to be created, the type of account and the like. For instance, a user who is identified to be a future 'employee' of the organization may be provided access to a 'user account' for a certain duration of time (for e.g., between the user's start date up until the user leaves the organization), whereas, a user who is identified to be a future 'contractor' of the organization may be provided access to a 'user account' for a shorter duration of time (for e.g., between a specified start date and an end date).

In certain embodiments, the IDM system may then, in co-operation with the one or more target systems, cause the identified accounts to be created or provisioned in the one or more target systems, at a first time. In some embodiments, the IDM system may then be configured to associate a second time with the identified accounts and cause, in co-operation with the one or more target systems, the identified accounts to be activated in each of the target systems at the second time. In an example, the second time may correspond to the start date of the identified accounts.

In accordance with at least some embodiments, the IDM system may be configured to identify one or more entitlements associated with each of the identified accounts for the user. As noted above, an entitlement may be a privilege or a set of privileges that can be granted to an account associated with the user that governs the user's access to resources within one or more target systems in the organization. For instance, the IDM system may be configured to identify, for a future 'employee' of the organization, identified as having access to a 'CRM account,' in a target system (e.g., a CRM system), a first entitlement that enables the user to access a first resource (e.g., 'sales-related' reports) and a second entitlement that enables the user to access a second resource (inventory' reports) from the target system (e.g., CRM system). In certain embodiments, the IDM system may then be configured to determine a start date and an end date for each of the identified entitlements associated with the identified account (e.g., CRM account). In an embodiment, the IDM system may determine the start and end dates for the identified entitlements based on information specified in the request. In other embodiments, the IDM system may also determine the start and end dates for the identified entitlements based on policy information as discussed above.

In certain embodiments, the IDM system may then be configured to determine a third time when the entitlement is to be associated with the account and associate the entitlement with the account. In some examples, the third time may correspond to the start date of the entitlement. In some embodiments, the IDM system may then in co-operation with the one or more target systems, cause the entitlement to be actually granted at the third time. In some examples, the third time may occur after the second time (i.e., after the identified account has been activated).

For instance, the IDM system may receive a request to create a 'CRM account' for a user in a CRM system. The IDM system, may, in co-operation with the target CRM system, cause the 'CRM account' to be created or provisioned on the CRM system at a first time, say Jan. 1, 2014. Based on information (e.g., the start date of the account) specified in the request, the IDM system may determine that the user is expected to join the organization at a second time, say Jan. 15, 2014. In this situation, the IDM system may associate the second time with the account and cause the account to be activated on the target CRM system at the second time. The IDM system may then identify one or more entitlements associated with the identified account. For instance, the IDM system may determine that the identified CRM account is associated with a first entitlement that enables the user to view information related to a first resource (e.g., 'sales-related' reports) in the target CRM system and a second entitlement that enables the user to view and modify access a second resource (inventory' reports) in the target CRM system. In some embodiments, the IDM system may then determine a third time when the entitlements have to be associated with the account and associate the entitlements with the account. The IDM system may then in co-operation with the target CRM system cause the entitlements to be granted at the third time. For instance, the IDM system may be configured to grant the first entitlement to enable the user to view 'sales-related' reports in the CRM system on Jan. 20, 2014 and grant the second entitlement to enable the user to view 'inventory' reports at a different time, say for example, Jan. 21, 2014. It may be noted that while the above examples specify a first time, a second time and a third time in terms of different dates on which accounts and/or entitlements may be created and/or granted for a user, it is to be appreciated that the first time, the second time and the third time may also be specified in terms of an actual time (e.g., in terms of an hour: minute: second) format or other formats, in other embodiments.

In certain embodiments, the IDM system may be configured to associate a de-activation time with the account and the entitlements associated with the account. The IDM system may then in co-operation with the one or more target systems, cause the account and the entitlements associated with the account to be de-activated and/or revoked on the one or more target systems at the de-activation time. As noted above, in some examples, the de-activation time may correspond to the end-dates of the account and the entitlements associated with the account.

FIG. 1 depicts aspects of an example system architecture 100 for managing accounts and entitlements in one or more target systems of an organization in accordance with at least one embodiment of the present disclosure. In an embodiment, the architecture 100 includes an identity management (IDM) system 114 communicatively connected to one or more user devices 102(1) . . . 102(N) (collectively, user devices 102) via a network 104.

Network 104 may facilitate communications and exchange of data between user devices 102 and IDM system 114. Network 104 may be any type of network familiar to those skilled in the art that can support data communications using any of a variety of commercially-available protocols, including without limitation TCP/IP, SNA, IPX, AppleTalk, and the like. Merely by way of example, network 104 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

User devices 102 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, user devices 102 may be any other electronic device, such as a thin-client computer, Internet-enabled gaming system, and/or personal messaging device, capable of communicating over a network (e.g., network 104). Although exemplary system environment 100 is shown with three user devices, any number of user and/or client computing devices may be supported, in other embodiments.

IDM system 114 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up identity management system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In certain embodiments, IDM system 114 may be responsible for managing user access to resources provided by one or more target systems 116(1) ... 116(N) (collectively, target systems 116) of an organization. As discussed above, the resources provided by target systems 116 may include, without limitation, software products, applications (e.g., cloud-based applications, enterprise applications, or any other applications), cloud services, various types of data (e.g., networked files, directory information, databases, or the like) and other resources. In certain embodiments, target systems 116 can have one or more 'entitlements' (e.g., E1, E2) defined and ready for assignment to one or more accounts (e.g., A1, A2, A3 ) on the target systems 116. As noted above, an entitlement granted to an account on a target system may enable an account owner (i.e., the user) to perform a specific task(s) or function(s). In some examples, an entitlement may be a privilege or a set of privileges that can be granted to an account associated with the user that governs the user's access to resources within target systems 116. An account for the user may have multiple entitlements assigned to the account in target systems 116. In certain examples, an entitlement may be a role, responsibility, or a group membership.

In accordance with at least some embodiments, users operating user devices 102 may communicate with IDM system 114 by accessing one or more web-based request user interfaces 104(1), 104(2) . . . 104(N) (collectively, request UIs 104) on user devices 102. In one embodiment, a user (e.g., an administrator) of the organization may utilize services provided by IDM system 114 to request for one or more accounts to be created for a user (e.g., a future employee) of the organization via request UIs 104. In some embodiments, the request UIs may include a graphical user interface viewable via a browser application on the user's device. In some examples, when IDM system 114 receives a request 106 from a user, IDM system 114 may generate an account form associated with the request and provide the account form to the requester, via request UIs 104. The requester (e.g., an administrator) may then use the account form to input information related to the request. For instance, the requester may specify and/or identify the accounts to be created and a duration during which the identified accounts should be made available to the user, via the account form. In some examples, the duration may specify a start date and an end date for each of the identified accounts for the user. In certain embodiments, the request may include user-specific information such as the type of user (e.g., employee, contractor, administrator, summer intern and the like) for whom the one or more accounts are to be created.

In some embodiments, upon receiving a request as discussed above, IDM system 114 may then in co-operation with target systems 116 cause each of the identified accounts specified in the request to be created or provisioned, at a first time. In some embodiments, the IDM system may then be configured to associate a second time with the identified accounts and cause, in co-operation with target systems 116, the identified accounts to be activated in each of the target systems, at the second time. In an example, the second time may correspond to the start date of the identified accounts.

As noted above, in some embodiments, the request itself may not specify and/or identify the accounts to be created for the user. In such embodiments, IDM system 114 may be configured to identify the accounts to be created for the user based on policy information stored in policy database 120. As noted above, such policy information may include access policies and/or rules that specify whether or not an account can be provisioned for a particular user and/or a particular type of user, the number and type of accounts that can be provisioned for the user, and the like.

Upon identifying the accounts to be created for the user as discussed above, in some instances, IDM system 114 may also be configured to determine the start dates and end dates for each of the identified accounts. In some examples, IDM system 114 may be configured to determine the start dates and end dates for each of the identified accounts based on the information specified in the request. In other embodiments, IDM system 114 may be configured to determine the start dates and end dates for each of the identified accounts based on information such the type of user for whom the account is to be created, the type of account and the like.

In certain embodiments, IDM system 114 may be configured to identify one or more entitlements associated with each of the identified accounts for the user. In certain embodiments, the IDM system may then be configured to determine a third time when the entitlements have to be associated with the identified accounts and associate the entitlements with the accounts. In some examples, the third time may correspond to the start date of the entitlements. In some embodiments, IDM system 114 may then in co-operation with target systems 116, cause the entitlements to be actually granted at the third time. In some examples, the third time may occur after the second time (i.e., after the accounts associated with the entitlements have been activated).

In certain embodiments, IDM system 114 may be configured to associate a de-activation time with the identified accounts and entitlements associated with the identified accounts. IDM system 114 may then in co-operation with target systems 116, cause the accounts and the entitlements associated with the accounts to be de-activated and/or revoked on target systems 116 at the de-activation time. As noted above, in some examples, the de-activation time may correspond to the end-dates of the identified accounts and the entitlements associated with the account.

In some embodiments, IDM system 114 may be configured to provide a notification 108(1), 108(2) . . . 108(N) (collectively, response 108) that one or more accounts and entitlements have been created or provisioned to the user, via request UI 104 in the user device 102.

In certain embodiments, environment 100 may include one or more data stores 118. In some embodiments, data stores 118 may include a policy database 120, an entitlement/account database 122 and a user accounts database 124. As noted above, policy database 120 may store a set of access policies and/or rules that specify whether or not an account can be provisioned for a particular user and/or a particular type of user, the number and type of accounts that can be provisioned for the user, and the like. Policy database 120 may also include rules that define an association between user groups and target resources. User groups may refer to collections of users to whom access to a common functionality may be granted, such as access rights, roles, or permissions.

In some embodiments, entitlement/account database 122 may store data related to entitlements granted to accounts in target systems 116 of the organization. Entitlement data may include, for example, privileges and access rights of users to resources in the target systems. Entitlement data may also include information related to roles assigned to users within the organization. For example, a role may define an access policy that includes a set of privileges and access rights of a user's access one or more entities such as accounts and entitlements in the target systems. For example, a sales manager role may define a set of privileges that enables a user to view sales statistics and employee information stored in a particular target system. User accounts database 124 may store information about a user's identity and/or credentials such as the user's username and password to access resources in different target systems of the organization.

In some embodiments, entitlements data may also be provided by target systems 116 and may be imported (or synchronized) from target systems 116 into IDM system 114. IDM system 114 may thus provide a central framework that different target systems can plug into. IDM system 114 can centrally manage the entitlements data across data stores 118 according to requests received from user devices 102. By centrally managing target systems 116, IDM system 114 can automate the process of exporting and importing entitlement and account data from one environment to another.

In certain embodiments, the identity management system 114 may include one or more connectors (not shown in FIG. 1) to interface with target systems 116 to access resources in the target systems. Each connector may be an interface to a particular type of target system. In some examples, a connector may be a link between IDM system 114 and target systems 116. A connector may refer to an abstraction for a collection of components that are used to perform provisioning operations on a target system. Each component may perform a specific role during provisioning. In a predefined connector, the definitions of these components may be included in connector XML files. When the connector XML files are imported during connector deployment, these components may be automatically created in the IDM system. Additional details of the operations performed by IDM system 114 are discussed in relation to FIGS. 2-5 below.

Figure 2:
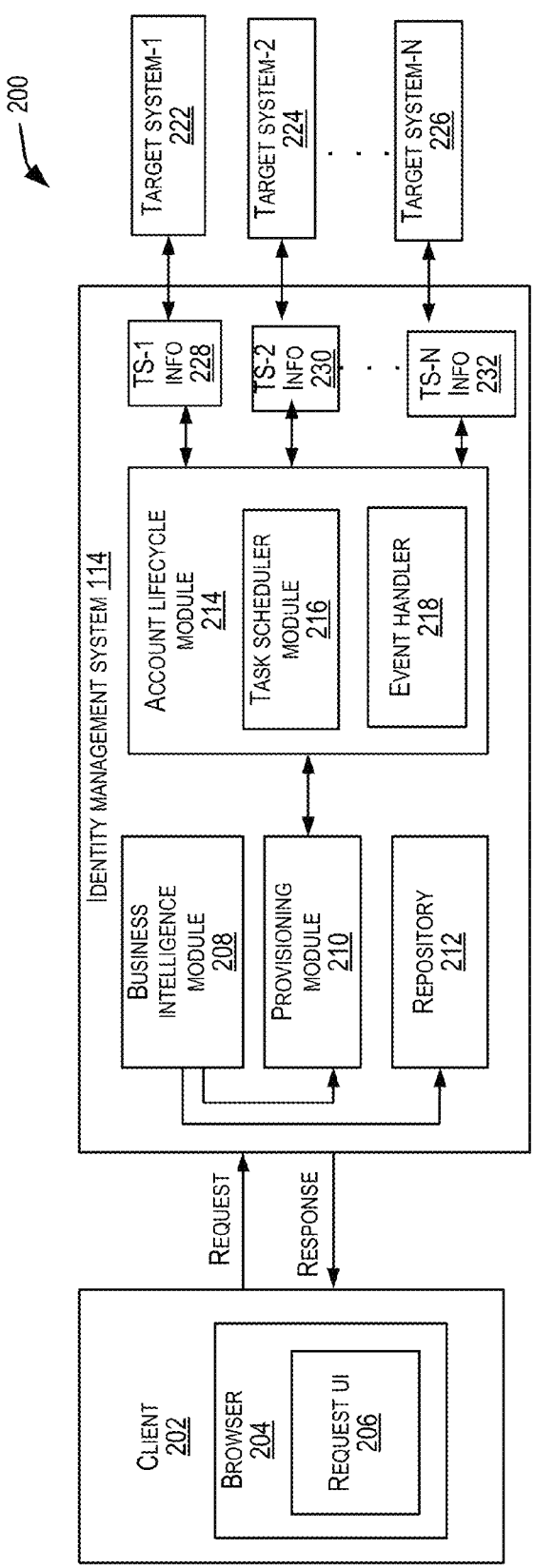
FIG. 2 depicts a simplified high-level diagram of an environment 200 comprising an identity management system according to an embodiment of the present invention.

FIG. 2 depicts a simplified high-level diagram of an environment 200 comprising an identity management system according to an embodiment of the present invention. In the embodiment depicted in FIG. 2, the components of identity management system 114 may include a business intelligence module 208, a provisioning module 210, an account lifecycle module 214 and a repository 212. These modules may include or be provided using one or more computers and/or servers which may be general purpose computers, specialized server computers, server farms, server clusters, or any other appropriate arrangement and/or combination. In some embodiments, identity management system 114 may be a component of a cloud infrastructure system discussed in detail in relation to FIG. 2. The various modules of identity management system 114 depicted in FIG. 2 are meant for illustrative purposes only and are not intended to limit the scope of embodiments of the present invention. Alternative embodiments may include more or fewer modules than those shown in FIG. 2.

In an exemplary operation, a user operating a client device such as client device 202 may utilize services provided by identity management system 114 by accessing request user interface (UI) 206 via a browser application 204 on client device 202. Client device 202 may be the same or similar as user devices 102 discussed in relation to FIG. 1. In some examples, the user may request for one or more accounts to be created for a user, via request UI 206. In some examples, when IDM system 114 receives a request from client device 202, it generates an account form associated with the request. IDM system 114 may then provide the account form to the requester via request UI 206 in the client device. A requester (e.g., administrator) may then use the account form to input information related to the request. For instance, the requester may specify and/or identify the accounts to be created and the duration of access of the identified accounts. As noted above, the requester may specify a start date and an end date for each of the identified accounts for the user. In certain embodiments, the requestor may also specify user-specific information in the request, such as the type of user (e.g., employee, contractor, administrator, summer intern and the like) for whom the one or more accounts are to be created.

In some instances, the request itself may not specify and/or identify the accounts to be created for the user. In such an embodiment, business intelligence module 208 may be configured to identify the accounts and one or more entitlements to be created for the user and determine the start dates and end dates of each of the identified accounts and entitlements. In some examples, business intelligence module 208 may be configured to identify the accounts and entitlements based on policy information stored in repository 212. As noted above, such policy information may include access policies and/or rules that specify whether or not an account and/or an entitlement can be provisioned for a particular user and/or a particular type of user, the number and type of accounts that can be provisioned for the user, the type of user for whom the account is to be provisioned, the type of account and the like.

In accordance with at least some embodiments, provisioning module 210 may be configured to cause, in co-operation with target systems 222, 224 and 226, the identified accounts and entitlements to be provisioned for the user in target systems 222, 224 and 226. As noted above, the identified accounts may be created or provisioned for the user at a first time. In some embodiments, provisioning module 210 may then associate a second time with the identified accounts and cause, in co-operation with target systems 222, 224 and 226, the accounts to be activated on the target systems, at the second time. Similarly, provisioning module 210 may determine a third time when the entitlements have to be associated with the identified accounts and associate the entitlements with the accounts. In certain embodiments, provisioning module 210 may cause, in co-operation with the target systems, the entitlements to be granted at the third time. As noted above, in some examples, the third time may occur after the second time (i.e., after the identified accounts have been activated). In certain embodiments, provisioning module 210 may be configured to generate an account-entitlement schema for a user as illustrated as shown in Table-1 below.

TABLE 1

| Account | Entitlement | Activation/Grant date/time | Deactivation/Revoke date/time | Target Systems |
|---------|-------------|----------------------------|-------------------------------|----------------|
| User account <'Provisioned,' Start date, End date> | Entitlement-1 <'Provisioned,' Start date, End date> | User account-start date Entitlement-1-start date | User account-end date Entitlement-1-end date | T1 |

TABLE 1-continued

| Account | Entitlement | Activation/Grant date/time | Deactivation/Revoke date/time | Target Systems |
|---|---|---|---|---|
| | Entitlement-2 <'Provisioned,' Start date, End date> | Entitlement-2-start date | Entitlement-2-end date | |
| Application-specific account <'Provisioned,' Start date, End date> | Entitlement-1 <'Provisioned,' Start date, End date> | Application specific account-start date Entitlement-1 start date | Application specific account-end date Entitlement-1-end date | T2 |
| Email account <'Provisioned,' Start date, End date> | Entitlement-1 <'Provisioned,' Start date, End date> | Email account-start date Entitlement-1-start date | Email account-end date Entitlement-1-end date | T3 |

As illustrated in Table-1, in some embodiments, the account-entitlement schema may include information about the assignment of various accounts and entitlements for a user, in one or more target systems of the organization. Specifically, the account-entitlement schema may include, for each user of the organization, the accounts and the entitlements that have been provisioned for the user, information such as the start and end times for each of the accounts and entitlements, the date on which the accounts and entitlements have to be granted and/or revoked and the target systems on which the accounts and/or entitlements have been created. For instance, the account-entitlement schema may identify, for a user, a 'user account' with a first entitlement (Entitlement-1) and a second entitlement (Entitlement-2) on a first target system T1, an 'application-specific account' (e.g., a CRM account) with a first entitlement (Entitlement-1) on a second target system, T2 and an 'email account' with a first entitlement (Entitlement-1) on a third target system, T3.

It is to be appreciated that the assignment of the different accounts and entitlements in different target systems, to a user as illustrated in Table-1 are not intended to limit the scope of the present invention but are merely discussed to provide examples of the manner in which accounts and entitlements assigned to a user may be represented. Additional accounts and entitlements in additional target systems may be identified and assigned to a user, in other embodiments. One of ordinary skill in the art would recognize many variations, modifications, and alternatives.

In accordance with at least some embodiments, account lifecycle module 214 may be configured manage a time period between the first time when the accounts and entitlements are created and the second time when the accounts and entitlements are to be activated. In some embodiments, account lifecycle module 214 may include a task scheduler module 216 and an event handler module 218. Task scheduler module 216 may be configured to execute a scheduled task routine that periodically identifies when the start date of the identified accounts and entitlements have been reached and performs an action when a set of pre-determined conditions are satisfied. As an example, task scheduler module 216 may be configured to change the status of the identified accounts and entitlements from a 'provisioned' state to an 'active' state or a 'granted state' when the start date of the accounts and entitlements have been reached and/or when the user is an in 'active' status (i.e., the user has joined the organization). Event handler 218 may be configured to receive an update (e.g., a change in the status of the account and/or entitlement from a 'provisioned' state to an 'active' state or 'granted' state) from task scheduler module 216 and communicate the changed status to provisioning module 210. Provisioning module 210 may be configured to update the account-entitlement schema to indicate the changed status. In some embodiments, provisioning module 210 may then cause, in co-operation with the target systems, the identified accounts and entitlements to be activated and/or granted.

In certain embodiments, provisioning module 210 may be configured to associate a de-activation time with the identified accounts and entitlements associated with the identified accounts. Provisioning module 210 may then in co-operation with target systems 116, cause the accounts and the entitlements associated with the accounts to be de-activated and/or revoked on target systems 116 at the de-activation time. As noted above, in some examples, the de-activation time may correspond to the end-dates of the identified accounts and the entitlements associated with the account.

In accordance with at least some embodiments, account lifecycle module 214 may be configured to communicate target system specific information, TS-1 info 228, TS-2 info 230 and TS-N info 232 to target systems, target system-1 222, target system-2 224 and target system-3 226 respectively. Target system specific information may include, for example, temporal information such as the start dates and end dates for the accounts and entitlements defined by the target system. In some embodiments, the target system specific information may be provided to the target systems in a target system specific format specific to each of the target systems 228, 230 and 232. In some embodiments, then IDM system may include one or more connectors (not shown in FIG. 2). The connectors may interface with the target systems 222, 224 and 226 to access resources in the target systems. The connectors may be the same as or similar to connectors discussed in relation to FIG. 1.

Repository 212 may be configured to store information about the users of identity management system 114. This information may include for each user, policy information, user identity information, security credentials, assigned accounts, entitlements, roles and responsibilities in the target systems of the organization.

FIGS. 3-6 illustrate example flow diagrams showing processes 300, 400, 500 and 600 for managing accounts and entitlements in a target system. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 3:
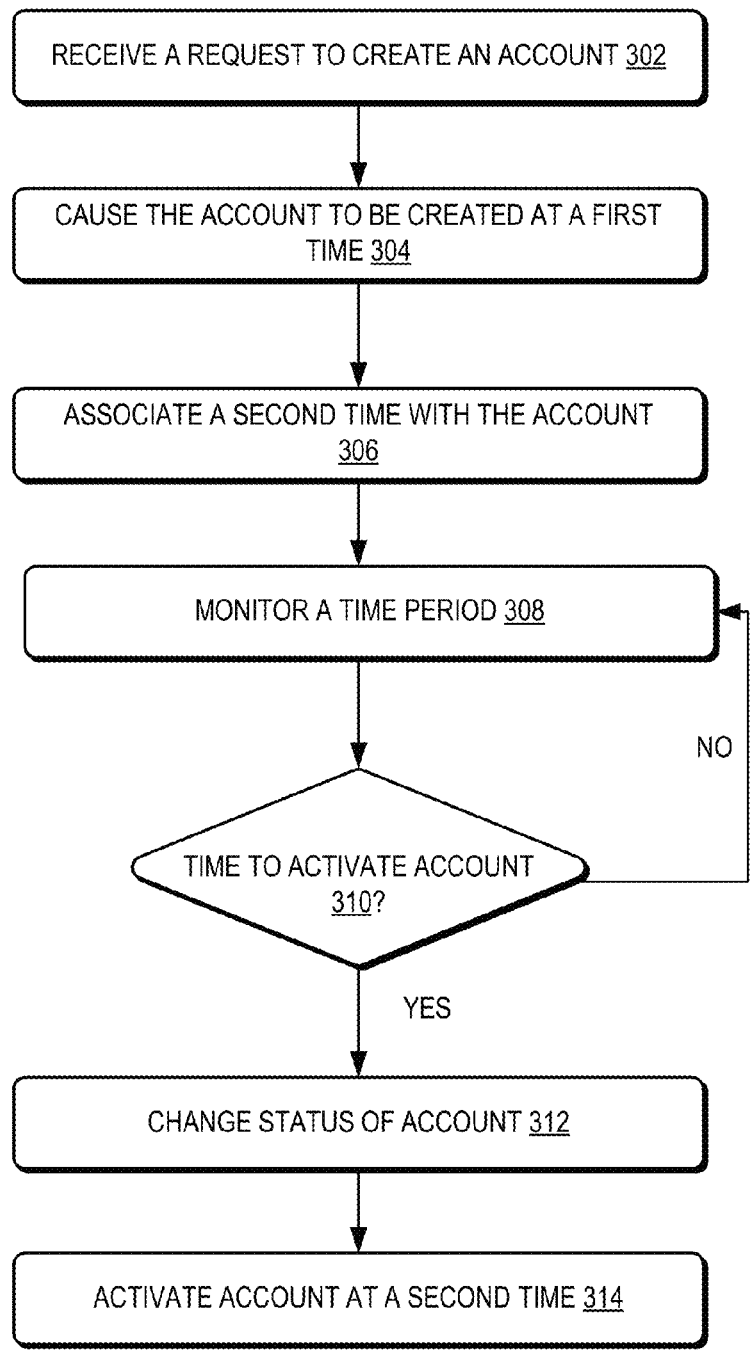
FIG. 3 illustrates an example flow diagram showing process 300 for managing accounts and entitlements in a target system, in accordance with one embodiment of the present invention.

FIG. 3 illustrates an example flow diagram showing process 300 for managing accounts and entitlements in a target system, in accordance with one embodiment of the present invention. In some aspects, the process 300 of FIG. 3 may be performed by the identity management system 114 (including the business intelligence module 208, the provisioning module 210 and the account lifecycle module 214) shown in FIGS. 1-2. The process 300 may begin at 302 by receiving a request to create an account in a target system of the organization. At 304, the process 300 may include causing the account to be created at a first time on the target system. In some embodiments, at 306, the process 300 may include associating a second time with the account. In some examples, the second time may correspond to the activation time of the account. For example, the activation time may correspond to the start date of the account. In some examples, at 308, the process 300 may include monitoring a time period between the first time when the account is created and the second time. At 310, the process 300 may include determining if the activation time of the account has been reached. If the activation time of the account has been reached, then in some embodiments, at 312, the process may include changing the status of the account from a 'provisioned' state to an 'active' state. In some embodiments, the process 300 may then include activating the account at the second time at 314.

Figure 4:
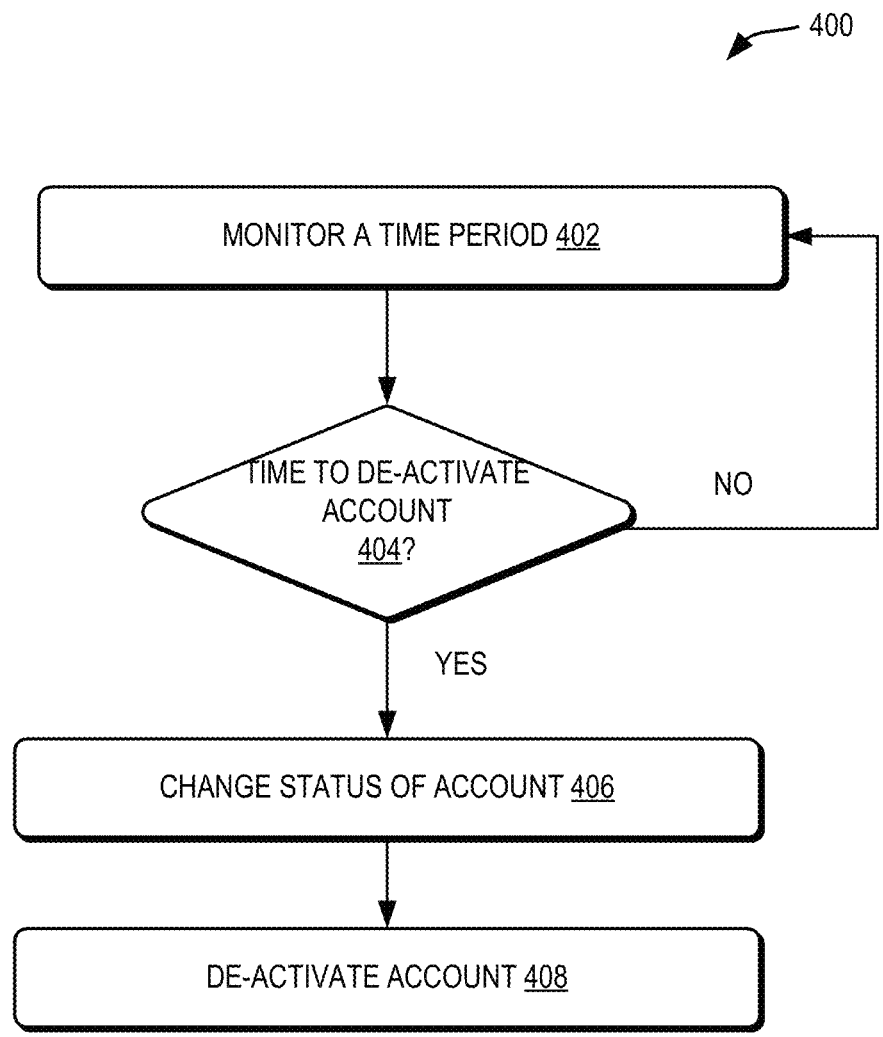
FIG. 4 illustrates an example flow diagram showing process 400 for managing accounts and entitlements in a target system, in accordance with one embodiment of the present invention.

FIG. 4 illustrates an example flow diagram showing process 400 for managing accounts and entitlements in a target system, in accordance with one embodiment of the present invention. In some aspects, the process 400 of FIG. 4 may be performed by the identity management system 114 (including the business intelligence module 208, the provisioning module 210 and the account lifecycle module 214) shown in FIGS. 1-2. The process 400 may begin at 402 by monitoring a time period. In some examples, the time period may correspond to a time when the account has been activated to a time when the account should be de-activated. In some examples, the time when the account should be de-activated may correspond to the end-time of the account. At 404, the process 400 may include determining if the de-activation time of the account has been reached. If the de-activation time of the account has been reached, then in some embodiments, at 406, the process may include changing the status of the account from an 'active' state to a 'de-active' state. In some embodiments, the process 400 may then include deactivating the account at 408.

Figure 5:
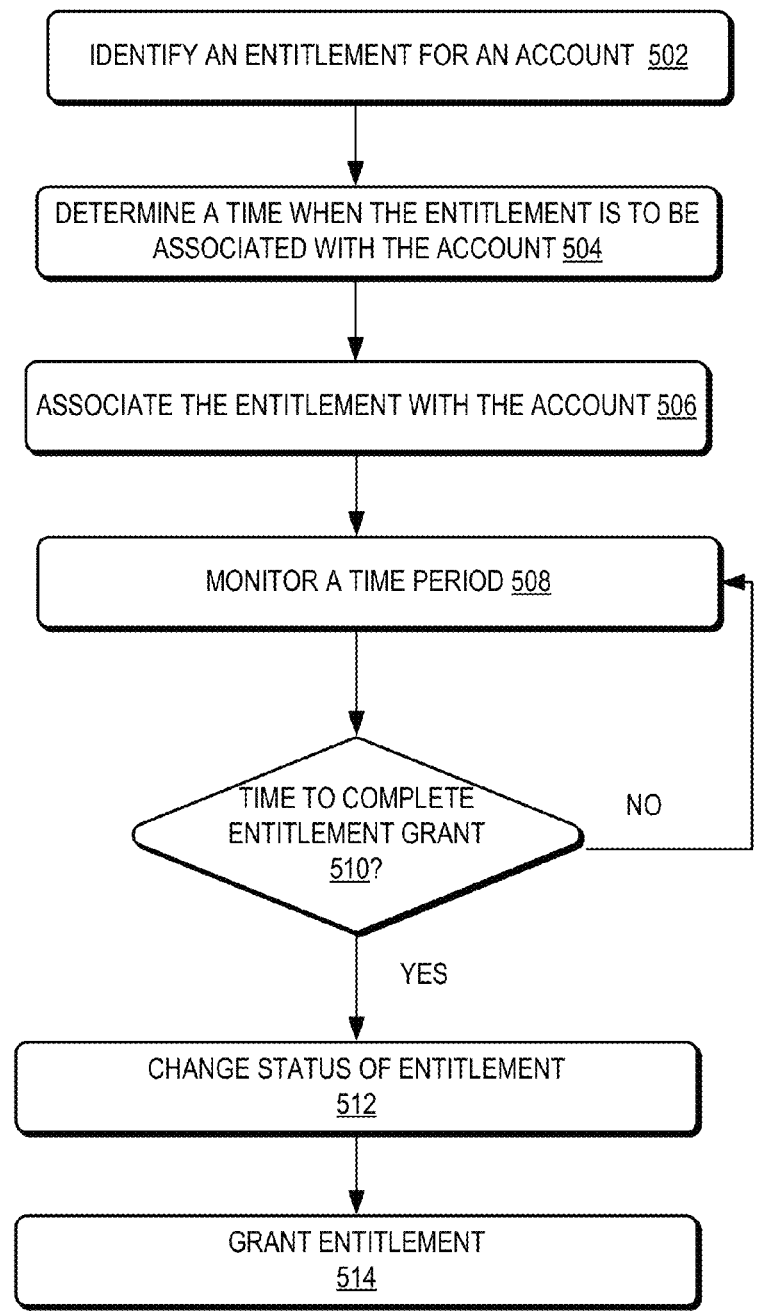
FIG. 5 illustrates an example flow diagram showing process 500 for managing accounts and entitlements in a target system, in accordance with one embodiment of the present invention.

FIG. 5 illustrates an example flow diagram showing process 500 for managing accounts and entitlements in a target system, in accordance with one embodiment of the present invention. In some aspects, the process 300 of FIG. 3 may be performed by the identity management system 114 (including the business intelligence module 208, the provisioning module 210 and the account lifecycle module 214) shown in FIGS. 1-2. The process 500 may begin at 502 by identifying an entitlement for a created account. At 504, the process 500 may include determining a time (e.g., a third time) when the entitlement is to be associated with the account. At 506, the process may include associating the entitlement with the account. In some embodiments, at 508, the process 500 may include monitoring a time period between the time when the entitlement is associated with the account and the time when the entitlement should be granted. In some examples, the time that the entitlement should be granted may occur after the second time (i.e., after the identified account has been activated). At 510, the process 500 may include determining if the time to complete the entitlement grant has been reached. If the time to complete the entitlement grant has been reached, then in some embodiments, at 512, the process may include changing the status of the entitlement from a 'provisioned' state to a 'granted' state. In some embodiments, the process 500 may then include granting the entitlement at the third time at 514.

Figure 6:
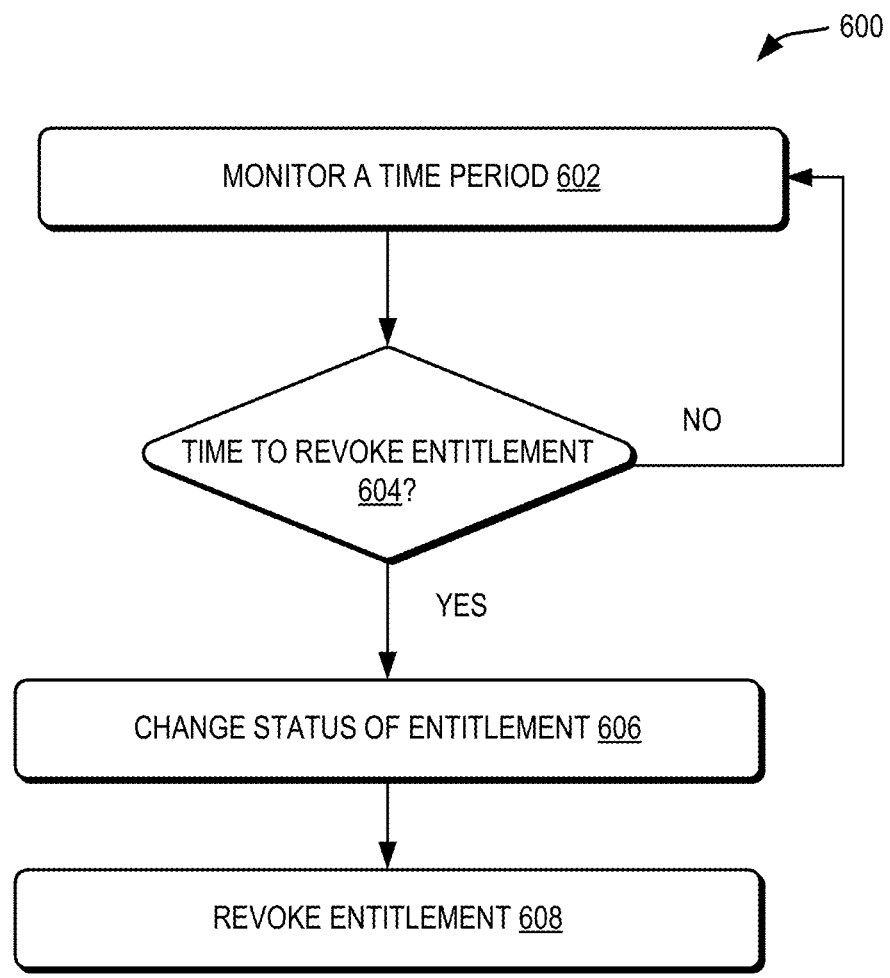
FIG. 6 illustrates an example flow diagram showing process 600 for managing accounts and entitlements in a target system, in accordance with one embodiment of the present invention.

FIG. 6 illustrates an example flow diagram showing process 600 for managing accounts and entitlements in a target system, in accordance with one embodiment of the present invention. In some aspects, the process 600 of FIG. 6 may be performed by the identity management system 114 (including the business intelligence module 208, the provisioning module 210 and the account lifecycle module 214) shown in FIGS. 1-2. The process 600 may begin at 602 by monitoring a time period. In some examples, the time period may correspond to a time when the entitlement associated with an account has been granted to a time when the entitlement should be revoked. In some examples, the time when the entitlement should be revoked may correspond to the end-time of the entitlement. At 604, the process 600 may include determining if the time at which the entitlement should be revoked has been reached. If the time at which the entitlement should be revoked has been reached, then in some embodiments, at 606, the process may include changing the status of the entitlement from a 'granted state to a 'revoked' state. In some embodiments, the process 600 may then include revoking the entitlement at 608.

Figure 7:
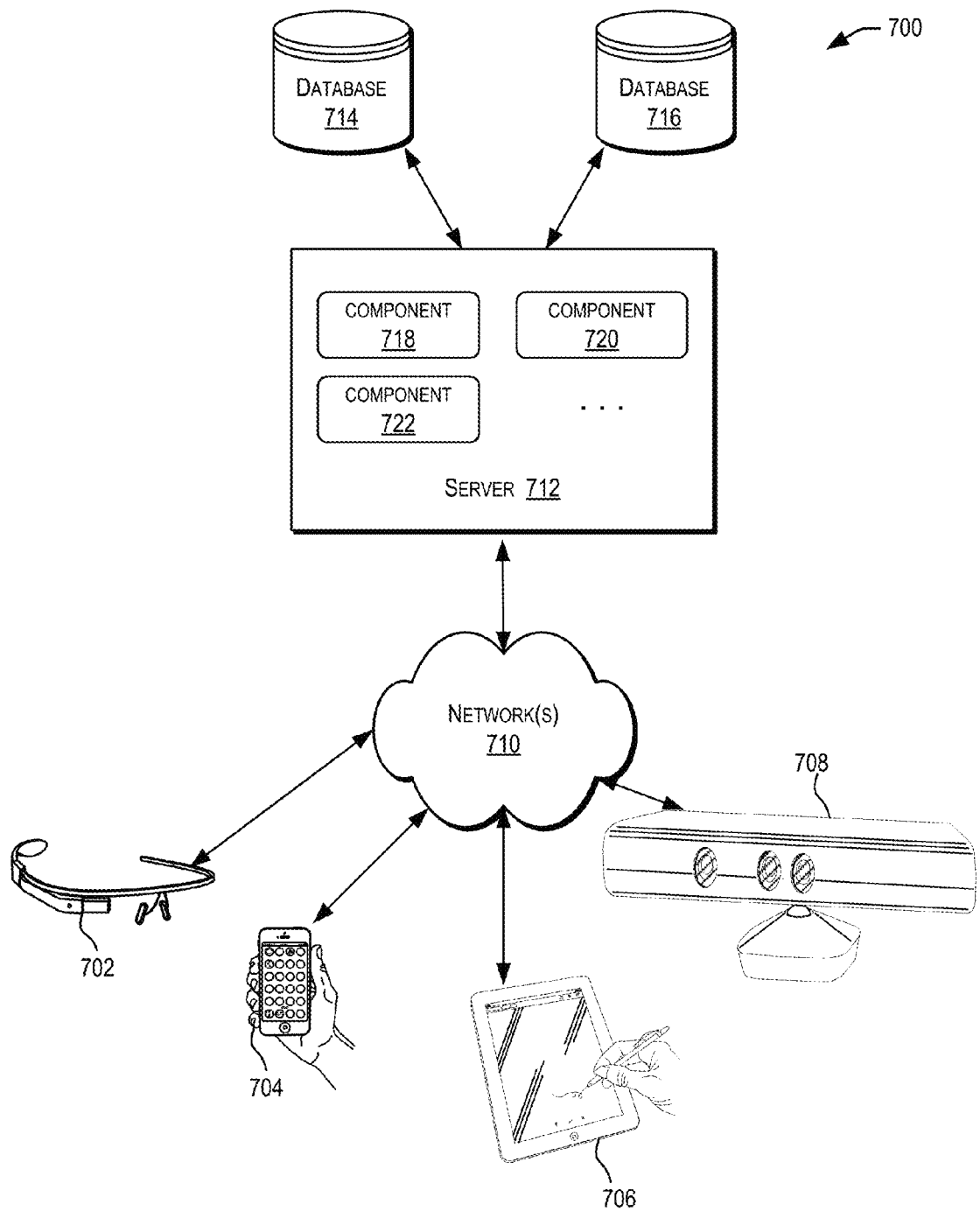
FIG. 7 depicts a simplified diagram of a distributed system 700 for implementing an embodiment of the present disclosure.

FIG. 7 depicts a simplified diagram of a distributed system 700 for implementing an embodiment of the present disclosure. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide identity management services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 76, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 10 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as user identity information, and other information used by embodiments of the present invention. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
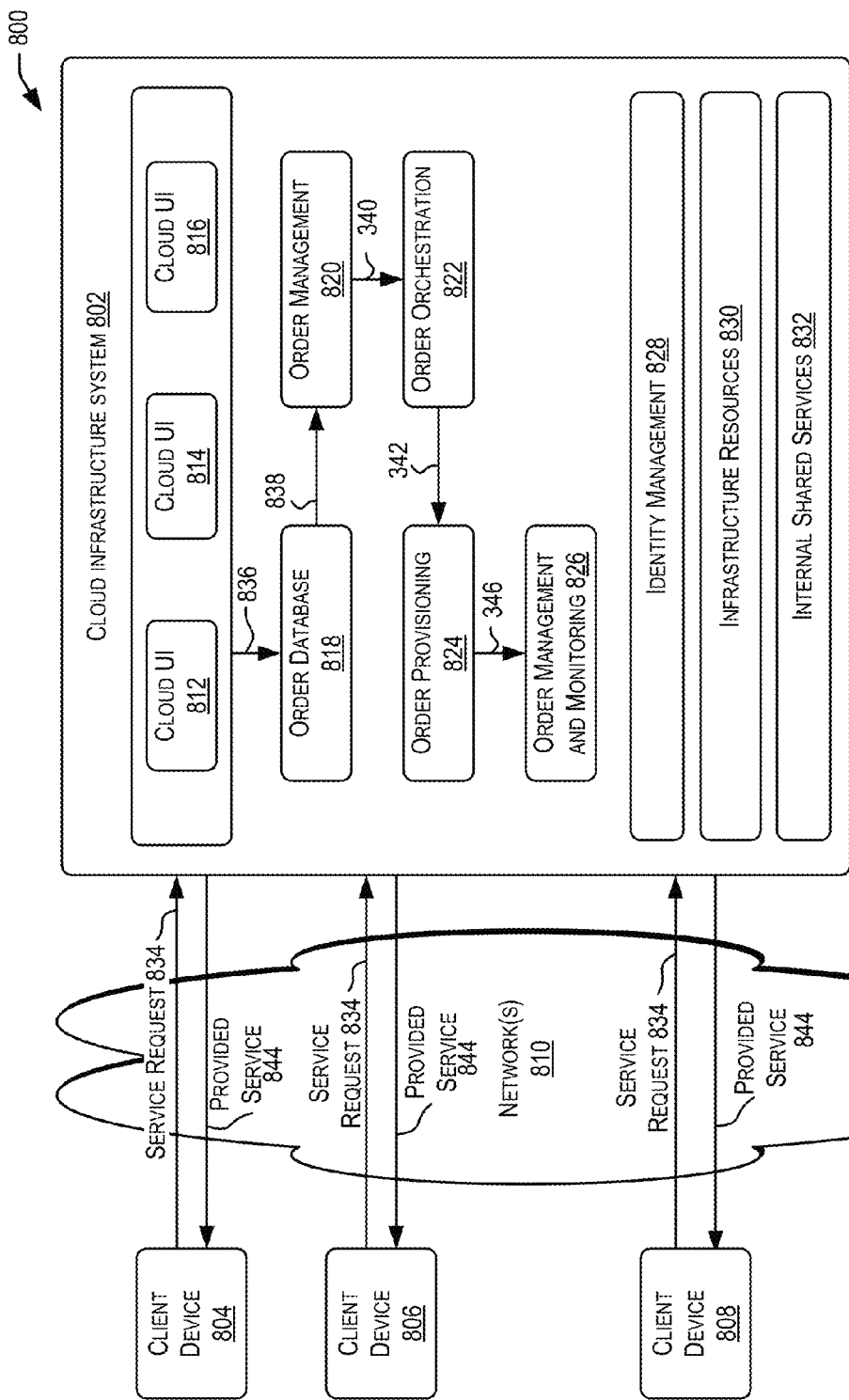
FIG. 8 is a simplified block diagram of one or more components of a system environment 800 in which services may be offered as cloud services, in accordance with an embodiment of the present disclosure.

In some embodiments, the identity management services described above may be offered as services via a cloud environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for managing entitlements stored in target systems of an organization. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle® Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
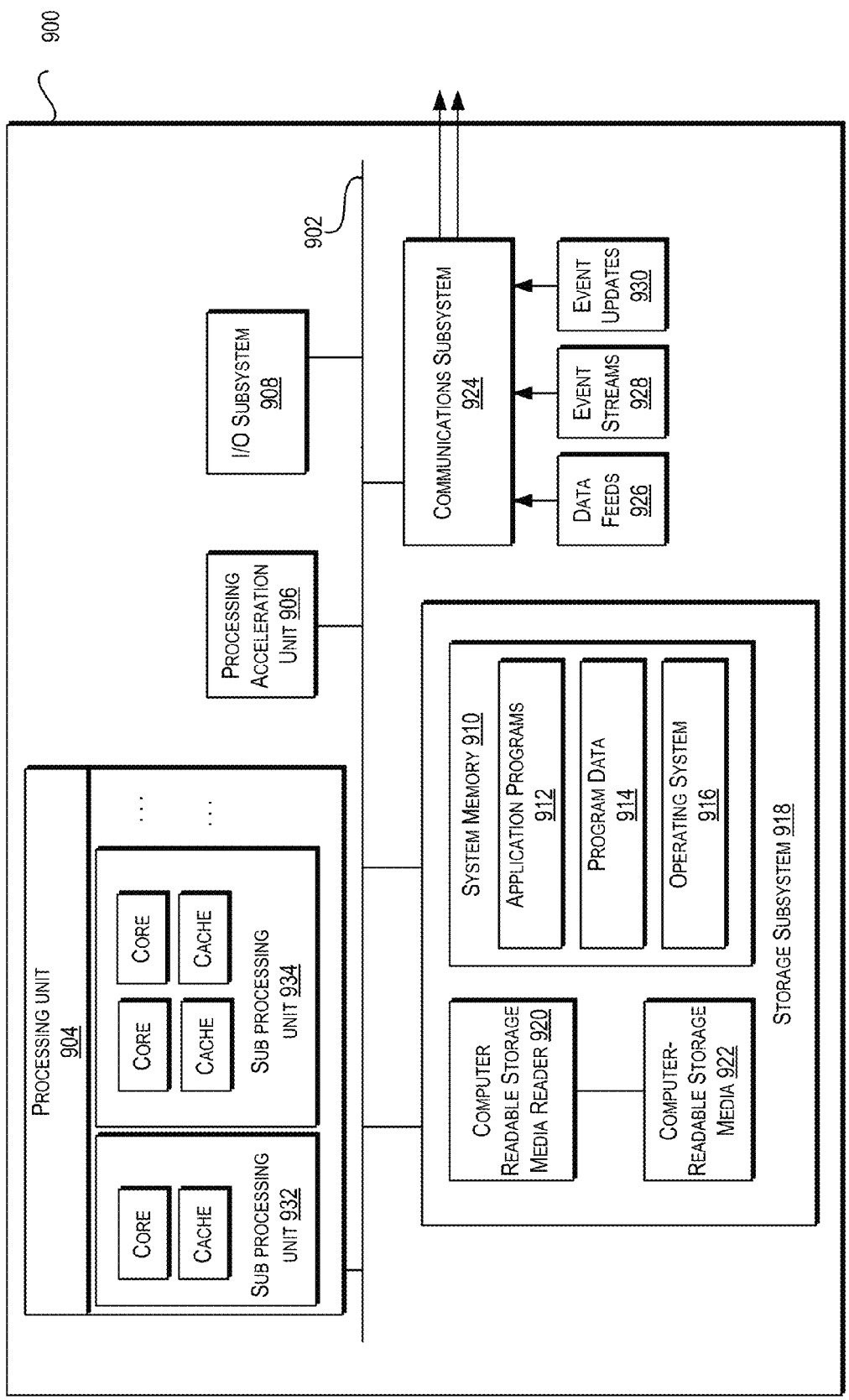
FIG. 9 illustrates an exemplary computer system 900 that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the account management system 112 depicted in FIG. 1 may receive user login information including input related to a training word from client devices using communication subsystem 924. Additionally, communication subsystem 924 may be used to communicate notifications of successful logins or notifications to re-enter a password from the account management system 112 to the requesting users.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
   receiving, by a first system, a request to create an account on a target system;
   causing, by the first system, in co-operation with the target system, the account to be created at a first time;
   determining, by the first system, an activation time for the account;
   associating, by the first system, a second time with the account, the second time corresponding to the activation time of the account; and
   causing, by the first system, in co-operation with the target system, the account to be activated on the target system, at the second time, wherein the second time occurs after the first time and wherein a difference between the first time and the second time is at least one day.

2. The computer-implemented method of claim 1, wherein the target system is at least one of an Active Directory system, a lightweight directory access protocol (LDAP) system, an Email system or a database system.

3. The computer-implemented method of claim 1, further comprising determining, by the first system, the activation time based on user information specified in the request.

4. The computer-implemented method of claim 1, further comprising determining, by the first system, the activation time based on access policies associated with the account.

5. The computer-implemented method of claim 1, further comprising:
associating, by the first system, a de-activation time with the account; and
causing, by the first system, in co-operation with the target system, the account to be de-activated on the target system at the de-activation time.

6. The computer-implemented method of claim 1, further comprising:
determining, by the first system, a third time when a first entitlement is to be associated with the account;
associating, by the first system, the first entitlement with the account, the first entitlement enabling a user to access a first resource on the target system;
causing, by the first system, in co-operation with the target system, the first entitlement to be granted at the third time, wherein the third time occurs after the second time;
determining, by the first system, a fourth time when a second entitlement is to be associated with the account, the second entitlement enabling the user to access a second resource on the target system, the second entitlement being different from the first entitlement and the second resource being different from the first resource; and
causing, by the first system, in co-operation with the target system, the second entitlement to be granted at the fourth time, wherein the fourth time occurs after the third time.

7. The computer-implemented method of claim 6, further comprising determining, by the first system, the third time based on user information specified in the request.

8. The computer-implemented method of claim 6, further comprising determining, by the first system, the third time based on access policies associated with the first entitlement.

9. The computer-implemented method of claim 6, further comprising:
associating, by the first system, a de-activation time with the first entitlement; an
causing by the first system, in co-operation with the target system, the first entitlement to be revoked on the target system at the de-activation time.

10. A system, comprising:
memory configured to store computer-executable instructions; and
at least one processor configured to access the memory and execute the computer-executable instructions to collectively at least:
receive, by the system, a request to create an account on a target system;
cause, by the system, in co-operation with the target system, the account to be created at a first time;
determine, by the system, an activation time for the account;
associate, by the system, a second time with the account, the second time corresponding to the activation time of the account; and
cause, by the system, in co-operation with the target system, the account to be activated on the target system, at the second time, wherein the second time occurs after the first time and wherein a difference between the first time and the second time is at least one day.

11. The system of claim 10, wherein the target system is at least one of an Active Directory system, a lightweight directory access protocol (LDAP) system, an Email system or a database system.

12. The system of claim 10, wherein the at least one processor is configured to execute the computer-executable instructions to determine the activation time based on user information specified in the request.

13. The system of claim 10, wherein the at least one processor is configured to execute the computer-executable instructions to determine the activation time based on access policies associated with the account.

14. The system of claim 10, wherein the at least one processor is configured to execute the computer-executable instructions to:
determine a third time when a first entitlement is to be associated with the account;
associate the first entitlement with the account, the first entitlement enabling a user to access a first resource on the target system;
cause, in co-operation with the target system, the first entitlement to be granted at the third time, wherein the third time occurs after the second time;
determining, by the system, a fourth time when a second entitlement is to be associated with the account, the second entitlement enabling the user to access a second resource on the target system, the second entitlement being different from the first entitlement and the second resource being different from the first resource; and
causing, by the system, in co-operation with the target system, the second entitlement to be granted at the fourth time, wherein the fourth time occurs after the third time.

15. One or more non-transitory computer-readable media storing computer-executable instructions executable by one or more processors, the computer-executable instructions comprising:
instructions that cause the one or more processors to receive, by a first system, a request to create an account on a target system;
instructions that cause the one or more processors to cause, by the first system, in co-operation with the target system, the account to be created at a first time;
instructions that cause the one or more processors to determine, by the first system, an activation time for the account;
instructions that cause the one or more processors to associate, by the first system, a second time with the account, the second time corresponding to the activation time of the account; and
instructions that cause the one or more processors to cause, by the first system, in co-operation with the target system, the account to be activated on the target system, at the second time, wherein the second time occurs after the first time and wherein a difference between the first time and the second time is at least one day.

16. The one or more non-transitory computer-readable media of claim 15, the instructions further comprising:
instructions that cause the one or more processors to associate, by the first system, a de-activation time with the account; and
instructions that cause the one or more processors to cause by the first system, in co-operation with the target system, the account to be de-activated on the target system at the de-activation time.

17. The one or more non-transitory computer-readable media of claim 15, the instructions further comprising:
   instructions that cause the one or more processors to determine, by the first system, a third time when a first entitlement is to be associated with the account;
   instructions that cause the one or more processors to associate, by the first system, the first entitlement with the account, the first entitlement enabling a user to access a first resource on the target system; and
   instructions that cause the one or more processors to cause, by the first system, in co-operation with the target system, the first entitlement to be granted at the third time, wherein the third time occurs after the second time;
   determining, by the first system, a fourth time when a second entitlement is to be associated with the account, the second entitlement enabling the user to access a second resource on the target system, the second entitlement being different from the first entitlement and the second resource being different from the first resource; and
   causing, by the first system, in co-operation with the target system, the second entitlement to be granted at the fourth time, wherein the fourth time occurs after the third time.

18. The one or more non-transitory computer-readable media of claim 17, the instructions further comprising instructions that cause the one or more processors to determine, by the first system, the third time based on user information specified in the request.

19. The one or more non-transitory computer-readable media of claim 18, the instructions further comprising instructions that cause the one or more processors to determine, by the first system, the third time based on access policies associated with the first entitlement.

20. The one or more non-transitory computer-readable media of claim 18, the instructions further comprising:
   instructions that cause the one or more processors to associate, by the first system, a de-activation time with the first entitlement; and
   instructions that cause the one or more processors to cause by the first system, in co-operation with the target system, the first entitlement to be revoked on the target system at the de-activation time.

21. The computer-implemented method of claim 1, further comprising:
   associating with the account, a first state, at the first time;
   monitoring, by the first system, a time period between the first time and the second time;
   determining, based at least in part on the monitoring, that the second time of the account has been reached; and
   based at least in part on the determining, changing the first state of the account to a second state.

* * * * *

UNITED STATES PATENT AND TRADEMARK OFFICE
CERTIFICATE OF CORRECTION

PATENT NO. : 9,813,426 B2
APPLICATION NO. : 14/593808
DATED : November 7, 2017
INVENTOR(S) : Vidhun et al.

Page 1 of 1

It is certified that error appears in the above-identified patent and that said Letters Patent is hereby corrected as shown below:

On the Title Page

On page 2, Column 1, under Other Publications, Line 11, delete "Capter" and insert -- Chapter --, therefor.

Signed and Sealed this
Nineteenth Day of June, 2018

Andrei Iancu
*Director of the United States Patent and Trademark Office*